United States Patent
Flore et al.

(10) Patent No.: US 8,437,752 B2
(45) Date of Patent: May 7, 2013

(54) METHOD AND SYSTEM FOR FACILITATING EXECUTION OF AUTOMATIC NEIGHBOR RELATION FUNCTIONS

(75) Inventors: Oronzo Flore, Ostuni (IT); Amer Catovic, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 12/414,395

(22) Filed: Mar. 30, 2009

(65) Prior Publication Data

US 2009/0247159 A1 Oct. 1, 2009

Related U.S. Application Data

(60) Provisional application No. 61/040,845, filed on Mar. 31, 2008.

(51) Int. Cl.
*H04W 24/00* (2009.01)

(52) U.S. Cl.
USPC ............ 455/434; 455/436; 370/331; 370/332

(58) Field of Classification Search ................... 455/403, 455/434, 436, 337, 438, 439; 370/331, 332
See application file for complete search history.

(56) References Cited

U.S. PATENT DOCUMENTS

| | | | |
|---|---|---|---|
| 2007/0213086 A1 | 9/2007 | Claussen et al. | |
| 2007/0254620 A1* | 11/2007 | Lindqvist et al. | 455/403 |
| 2007/0291770 A1 | 12/2007 | Kitazoe | |
| 2008/0062906 A1* | 3/2008 | Baker et al. | 370/315 |
| 2008/0108353 A1* | 5/2008 | Lee et al. | 455/437 |
| 2008/0207207 A1* | 8/2008 | Moe et al. | 455/439 |
| 2008/0227455 A1* | 9/2008 | Kim | 455/436 |
| 2009/0047955 A1* | 2/2009 | Frenger et al. | 455/436 |
| 2009/0082021 A1 | 3/2009 | Matsuzawa et al. | |
| 2010/0062755 A1* | 3/2010 | Quilty | 455/418 |

(Continued)

FOREIGN PATENT DOCUMENTS

| | | | |
|---|---|---|---|
| CN | 1437834 A | 8/2003 | |
| CN | 1553609 A | 12/2004 | |

(Continued)

OTHER PUBLICATIONS

"Ericsson:" "Requirements for Automatic Neighbour Relations" 3GPP Draft; S5-080409 E Requirements for ANR, 3rd Generation Partnership Project (3GPP), Mobile Competence Centre; 650, Route Des Lucioles; F-06921 Sophia-Antipolis Cedex; France, vol. SA WG5, no. St Julian, Malta; 20080218, Feb. 10, 2008, XP050307020 paragraph [03.1]".

(Continued)

*Primary Examiner* — Cong Tran
(74) *Attorney, Agent, or Firm* — John J. Ketchum

(57) ABSTRACT

Methods and apparatuses for facilitating execution of automatic neighbor relation (ANR) functions are provided. A base station and operation and maintenance (OAM) system are disclosed. The base station receives neighbor cell detection data identifying neighbor cells detected by an access terminal. The base station also receives neighbor cell management data generated by the OAM system, which facilitates performing an ANR function. The base station then automatically updates a neighbor list according to the neighbor cell management data and the neighbor cell detection data.

40 Claims, 12 Drawing Sheets

U.S. PATENT DOCUMENTS

| | | | |
|---|---|---|---|
| 2010/0178921 A1* | 7/2010 | Aqvist et al. | 455/436 |
| 2010/0278161 A1* | 11/2010 | Ore et al. | 370/338 |
| 2010/0285802 A1* | 11/2010 | Ahluwalia et al. | 455/436 |

FOREIGN PATENT DOCUMENTS

| | | |
|---|---|---|
| EP | 0960537 | 11/2005 |
| EP | 1773073 A2 | 4/2007 |
| EP | 1903816 A1 | 3/2008 |
| JP | 2007251368 A | 9/2007 |
| RU | 2273964 C2 | 4/2006 |
| WO | 03019798 A2 | 3/2003 |
| WO | WO2006125149 A2 | 11/2006 |

OTHER PUBLICATIONS

International Search Report and Written Opinion—PCT/US2009/039016, International Search Authority—European Patent Office—Aug. 20, 2009.

TSG RAN3: "LS on Inter-RAT/frequency Automatic Neighbour Relation Function" 3GPP Draft; GP-071851, 3rd Generation Partnership Project (3GPP), Mobile Competence Centre ; 650, Route Des Lucioles ; F-06921 Sophia-Antipolis Cedex ; France, vol. TSG GERAN, no. Vancouver; Nov. 12, 2007, XP050019185 the whole document.

Ericsson, "Introduction of automatic neighbour relation function", 3GPP TSG RAN WG3 Meeting #57bis, R3-072014, Oct. 8-11, 2007, Sophia Antipolis, France.

QUALCOMM Europe, T-Mobile, "Inter-RAT/frequency Automatic Neighbour Relation Function", 3GPP TSG-RAN WG3 Meeting #58, R3-072117, Nov. 5-9, 2007 Jeju Island, Korea.

Taiwan Search Report—TW098110814—TIPO—Mar. 25, 2012.

European Search Opinion—EP12164407, Search Authority—Hague Patent Office—May 9, 2012.

Taiwan Search Report—TW098110814—TIPO—Sep. 16, 2012.

* cited by examiner

```
BASE STATION UNIT

PROCESSOR
    COMPONENT
       210

MEMORY              RRC
COMPONENT        COMPONENT
   220              220

OAM               ANR
INTERFACE         FUNCTION
COMPONENT        COMPONENT
   240              250
```

METHOD AND SYSTEM FOR FACILITATING EXECUTION OF AUTOMATIC NEIGHBOR RELATION FUNCTIONS

CROSS-REFERENCE TO RELATED APPLICATIONS

This application claims the benefit of U.S. Provisional Patent application Ser. No. 61/040,845 entitled "APPARATUS AND METHODS FOR ANR FUNCTION IN THE LTE NETWORKS," which was filed Mar. 31, 2008.

BACKGROUND

I. Field

The present application relates generally to wireless communications, and more specifically to a method and system for facilitating execution of automatic neighbor relation (ANR) functions in a Long Term Evolution (LTE) system.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The rapidly evolving complexity of LTE systems has placed increased demands on the operation and maintenance of LTE networks. Within the context of neighbor relations, manual efforts to configure a base station's neighbor list will thus soon be unsustainable. Accordingly, it would be desirable to have a method and apparatus directed towards automatically updating a neighbor list so that human interaction can be reduced and the capacity of the network can be increased.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating managing cells in a multi-carrier system. In one aspect, a method, apparatus, and computer program product is disclosed for facilitating execution of automatic neighbor relation (ANR) functions from a base station. Within such embodiment, the base station receives neighbor cell detection data from an access terminal, which identifies neighbor cells detected by the access terminal. The base station also receives neighbor cell management data from an operation and maintenance (OAM) system, which includes data that facilitates performing at least one ANR function. The base station then automatically updates a neighbor list as a function of the neighbor cell management data and the neighbor cell detection data.

In another aspect, a method, apparatus, and computer program product is disclosed for facilitating execution of ANR functions in a base station from an OAM system. Within such embodiment, the OAM system receives ANR data from the base station, which includes neighbor cell detection data and/or neighbor list report data. The neighbor cell detection data identifies neighbor cells detected by an access terminal, whereas the neighbor list report data includes a summary of updates made to a neighbor list. The OAM system generates neighbor cell management data as a function of the ANR data, which includes data that facilitates performing at least one ANR function. The OAM system then transmits the neighbor cell management data to the base station.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
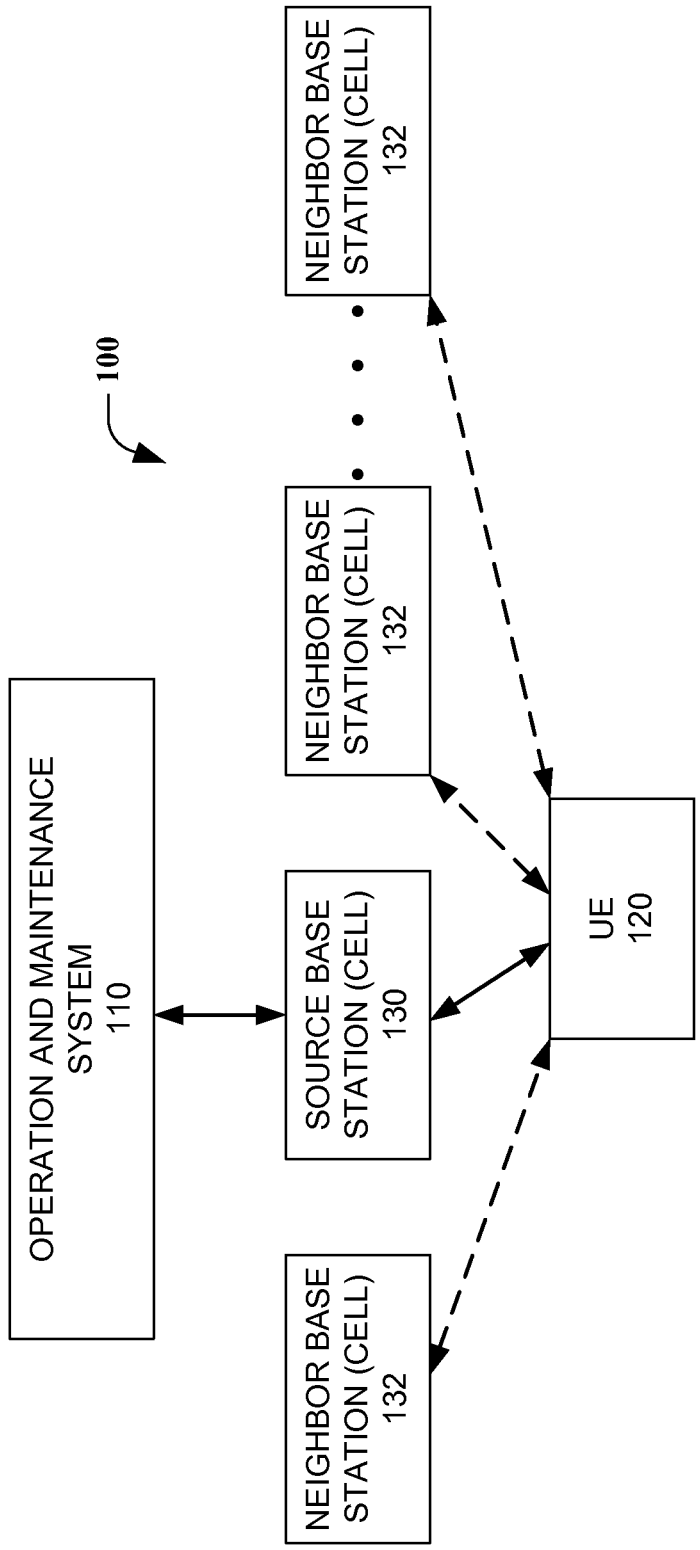
FIG. 1 is an illustration of an exemplary wireless communication system for facilitating execution of ANR functions in accordance with an embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Referring next to FIG. 1, an illustration of an exemplary wireless communication system for facilitating execution of ANR functions in accordance with an embodiment is provided. As illustrated, system 100 may include an operation and maintenance (OAM) device 110 in communication with each of a plurality of base stations 130 and 132. In a first embodiment, source base station 130 relies on UE 120 to detect cells that that are not currently in its neighbor list (e.g., cells serviced by any of base stations 132). In another embodiment, because neighbor relations are cell-based, the neighbor list can be cell-specific (i.e., each cell can have its own neighbor list), although the ANR function is base station-based. Moreover, it is possible to have an ANR function manage multiple neighbor lists (e.g., one for each cell). Under either embodiment, UE 120 may be instructed by base station 130 to measure/report on any of several types of cells including the serving cell, listed cells (i.e., cells indicated by the E-UTRAN as part of the list of neighboring cells), and detected cells (i.e., cells not indicated by the E-UTRAN but detected by the UE).

Figure 2:
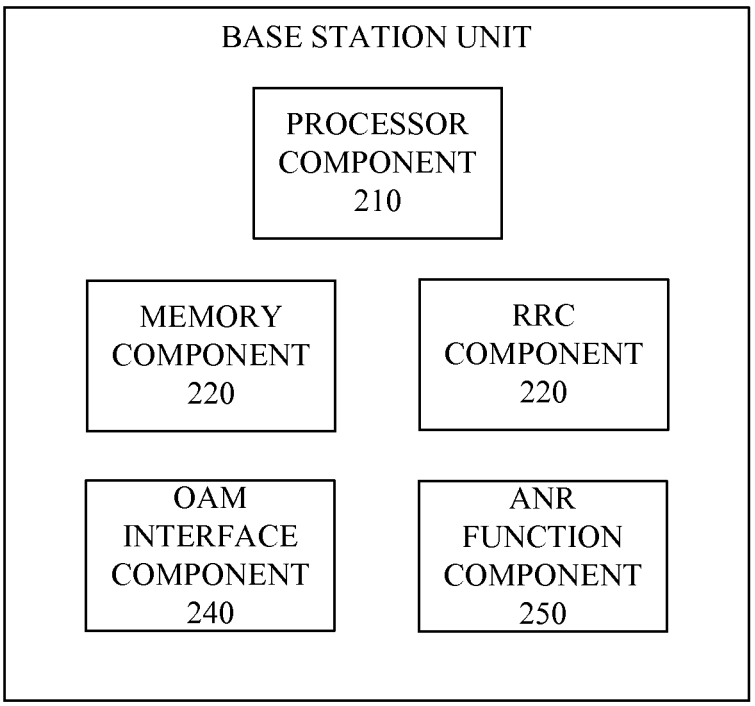
FIG. 2 is a block diagram of an exemplary base station unit in accordance with an embodiment.

Referring next to FIG. 2, a block diagram of an exemplary base station unit in accordance with an embodiment is provided. As illustrated, base station unit 200 may include processor component 210, memory component 220, radio resource control (RRC) component 230, OAM interface component 240, and ANR function component 250.

In one aspect, processor component 210 is configured to execute computer-readable instructions related to performing any of a plurality of functions. Processor component 210 can be a single processor or a plurality of processors dedicated to analyzing information to be communicated from base station unit 200 and/or generating information that can be utilized by memory component 220, radio resource control (RRC) component 230, OAM interface component 240, and/or ANR function component 250. Additionally or alternatively, processor component 210 may be configured to control one or more components of base station unit 200.

In another aspect, memory component 220 is coupled to processor component 210 and configured to store computer-readable instructions executed by processor component 210. Memory component 220 may also be configured to store any of a plurality of other types of data including data generated/obtained by any of radio resource control (RRC) component 230, OAM interface component 240, and/or ANR function component 250. Memory component 220 can be configured in a number of different configurations, including as random access memory, battery-backed memory, hard disk, magnetic tape, etc. Various features can also be implemented upon memory component 220, such as compression and automatic back up (e.g., use of a Redundant Array of Independent Drives configuration).

As illustrated, base station unit 200 also includes RRC component 230 which is coupled to processor component 210 and configured to interface base station unit 200 with any of a plurality of access terminals. In a particular embodiment, RRC component 230 is configured to facilitate communications between the base station unit 200 and an access terminal, wherein measurements pertaining to cells detected by an access terminal are requested and received from the access terminal via RRC component 230. For instance, RRC component 230 may instruct the access terminal to ascertain the global ID of a cell detected by the access terminal, wherein such instructions may reference a physical ID corresponding to particular measurements received from the access terminal.

In another aspect, base station unit 200 also includes OAM interface component 240. Here, OAM interface component 240 is configured to facilitate communications between the base station unit 200 and an OAM system. Within such embodiment, OAM interface component 240 may be configured to receive any of a plurality of types of neighbor cell management data from the OAM. Indeed, for some embodiments, OAM interface component 240 may receive data that facilitates an internal processing of ANR functions (e.g., an ANR handover blacklist/whitelist and/or an ANR X2 blacklist/whitelistmay be received for processing by the base station unit 200), whereas other embodiments may include receiving data encapsulating an external processing of ANR functions (e.g., receiving explicit commands from the OAM on how to update the neighbor list). OAM interface component 240 may also be configured to report updates to the OAM system, which summarize neighbor list updates implemented by base station unit 200.

In yet another aspect, base station 200 includes ANR function component 250 which is configured to perform any of a plurality of ANR functions. Within such embodiment, ANR function component 250 may include any of a plurality of subcomponents to perform various ANR functions. For instance, a neighbor detection subcomponent may be included to interface with RRC component 230, wherein detection data is routed from RRC component 230 to either an OAM system (i.e., for external processing) or a subcomponent within base station unit 200 (i.e., for internal processing). For internal processing, an exemplary configuration of ANR function component 250 may thus include a handover relations subcomponent and/or an X2 relations subcomponent coupled to the neighbor detection subcomponent. An update subcomponent may also be included to implement update requests, wherein such requests may include internal requests (e.g., requests from the handover relations subcomponent and/or the X2 relations subcomponent) and/or external requests (e.g., requests from the OAM system).

Figure 3:
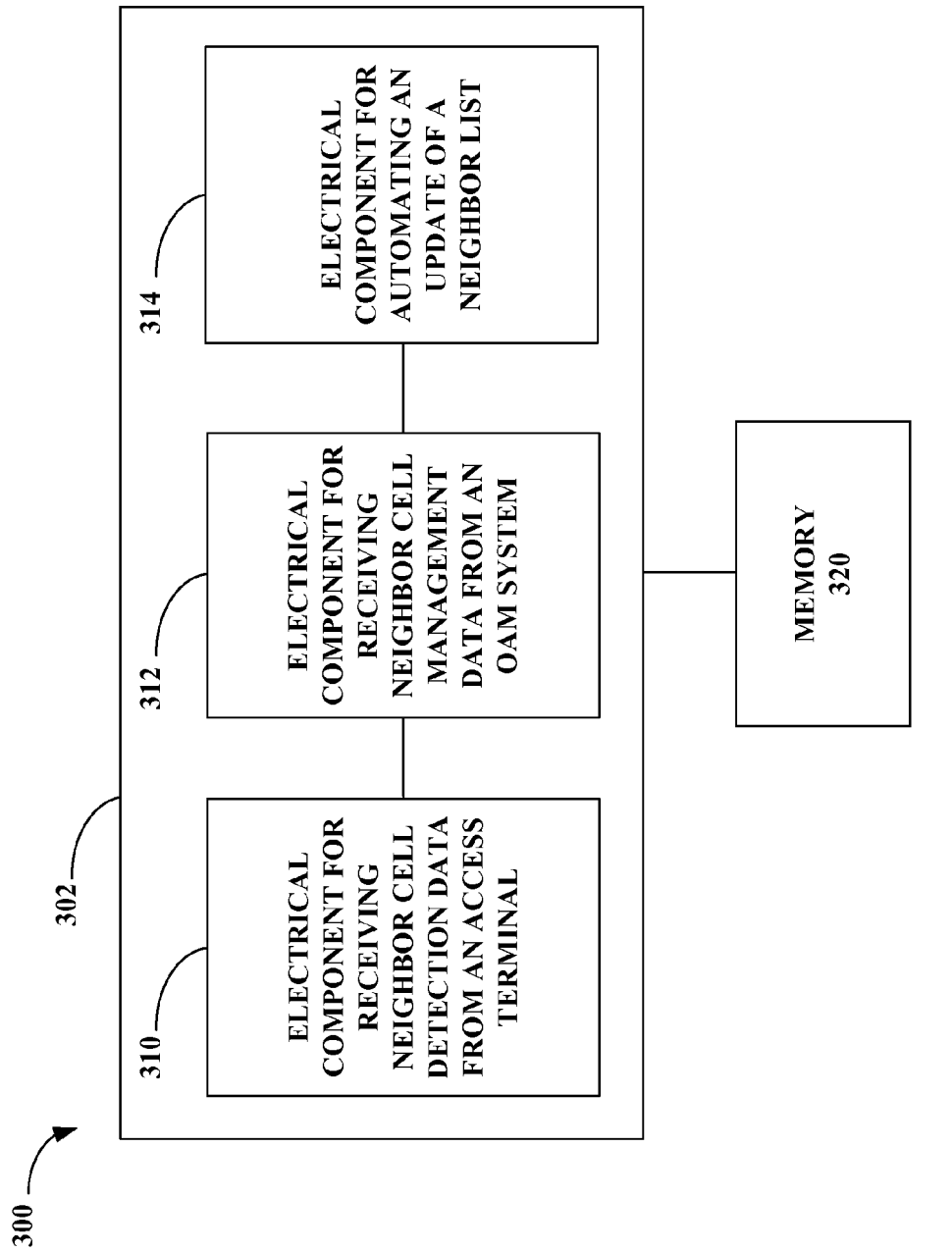
FIG. 3 is an illustration of an exemplary coupling of electrical components that facilitates execution of ANR functions in a base station in accordance with an embodiment.

Turning to FIG. 3, illustrated is a system 300 that facilitates execution of ANR functions in accordance with aspects disclosed herein. System 300 can reside within a base station, for instance. As depicted, system 300 includes functional blocks that can represent functions implemented by a processor, software, or combination thereof (e.g., firmware). System 300 includes a logical grouping 302 of electrical components that can act in conjunction. As illustrated, logical grouping 302 can include an electrical component for receiving neighbor cell detection data from an access terminal 310. Further, logical grouping 302 can include an electrical component for receiving neighbor cell management data from an OAM system 312, as well as an electrical component for automating an update of a neighbor list based on the neighbor cell detection data and the neighbor cell management data 314. Additionally, system 300 can include a memory 320 that retains instructions for executing functions associated with electrical components 310, 312, and 314. While shown as being external to memory 320, it is to be understood that electrical components 310, 312, and 314 can exist within memory 320.

Figure 4:
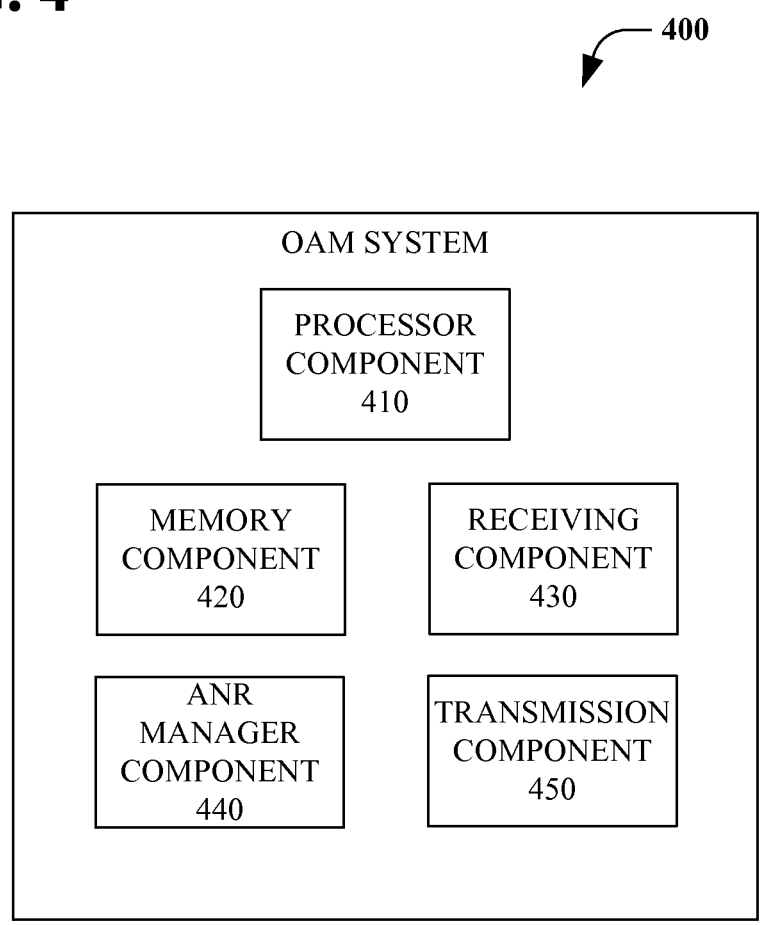
FIG. 4 is a block diagram of an exemplary OAM system in accordance with an embodiment.

Referring next to FIG. 4, a block diagram of an exemplary OAM system in accordance with an embodiment is provided. As illustrated, OAM system 400 may include processor component 410, memory component 420, receiving component 430, ANR manager component 440, and transmitting component 450.

Similar to processor component 210 in base station unit 200, processor component 410 is configured to execute computer-readable instructions related to performing any of a plurality of functions. Processor component 410 can be a single processor or a plurality of processors dedicated to analyzing information to be communicated from OAM system 400 and/or generating information that can be utilized by memory component 420, receiving component 430, ANR manager component 440, and/or transmitting component 450. Additionally or alternatively, processor component 410 may be configured to control one or more components of OAM system 400.

In another aspect, memory component 420 is coupled to processor component 410 and configured to store computer-readable instructions executed by processor component 410. Memory component 420 may also be configured to store any of a plurality of other types of data including data generated/obtained by any of receiving component 430, ANR manager component 440, and/or transmitting component 450. Here, it should be noted that memory component 420 is analogous to memory component 220 in base station unit 200. Accordingly, it should be appreciated that any of the aforementioned features/configurations of memory component 220 are also applicable to memory component 420.

As illustrated, OAM system 400 also includes receiving component 430 and transmitting component 450. In an aspect, receiving component 430 is configured to receive any of a plurality of types of data from any of a plurality of base stations, whereas transmitting component 450 is configured to transmit any of a plurality of types of data to any of a plurality of base stations. As stated previously with respect to base station 200, data received via receiving component 430 may include detection data routed from a neighbor detection subcomponent and/or updates reported to OAM system 400 summarizing neighbor list updates implemented by the base station(s). Similarly, as was also stated with respect to base station 200, data transmitted via transmitting component 450 may include an ANR handover blacklist/whitelist and/or an ANR X2 blacklist/whitelist for processing by the base station (s), as well as explicit update commands processed by OAM system 400.

In another aspect, OAM system 400 includes ANR manager component 440 which is configured to generate any of a plurality of types of management data for facilitating performing any of various ANR functions. Namely, ANR manager component 440 may be configured to generate the aforementioned ANR handover blacklists/whitelists, ANR X2 blacklists/whitelists, and/or explicit update commands. To this end, ANR manager component 440 may include a network manager layer in communication with an elements manager layer, wherein the elements manager layer may include a handover relations subcomponent and/or X2 relations subcomponent for performing ANR functions similar to ANR function component 250.

Figure 5:
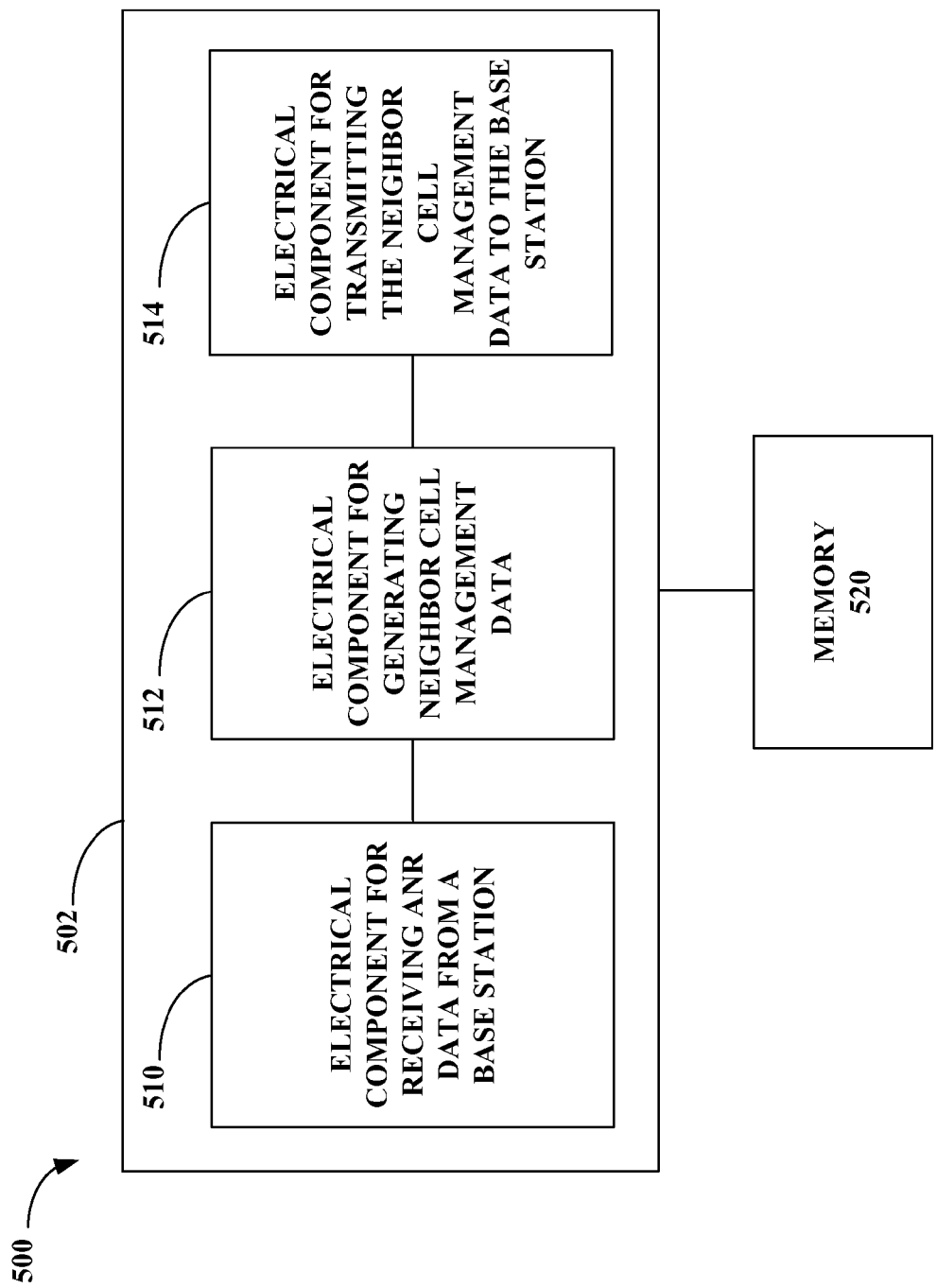
FIG. 5 is an illustration of an exemplary coupling of electrical components that facilitates execution of ANR functions in an OAM system in accordance with an embodiment.

Referring next to FIG. 5, illustrated is another system 500 that facilitates execution of ANR functions in accordance with aspects disclosed herein. System 500 can reside within an OAM system, for instance. Similar to system 300, system 500 includes functional blocks that can represent functions implemented by a processor, software, or combination thereof (e.g., firmware), wherein system 500 includes a logical grouping 502 of electrical components that can act in conjunction. As illustrated, logical grouping 502 can include an electrical component for receiving neighbor cell detection data from an access terminal 510. Further, logical grouping 502 can include an electrical component for receiving neighbor cell management data from an OAM system 512, as well as an electrical component for automating an update of a neighbor list based on the neighbor cell detection data and the neighbor cell management data 514. Additionally, system 500 can include a memory 520 that retains instructions for executing functions associated with electrical components 510, 512, and 514, wherein any of electrical components 510, 512, and 514 can exist either within or outside memory 520.

Figure 6:
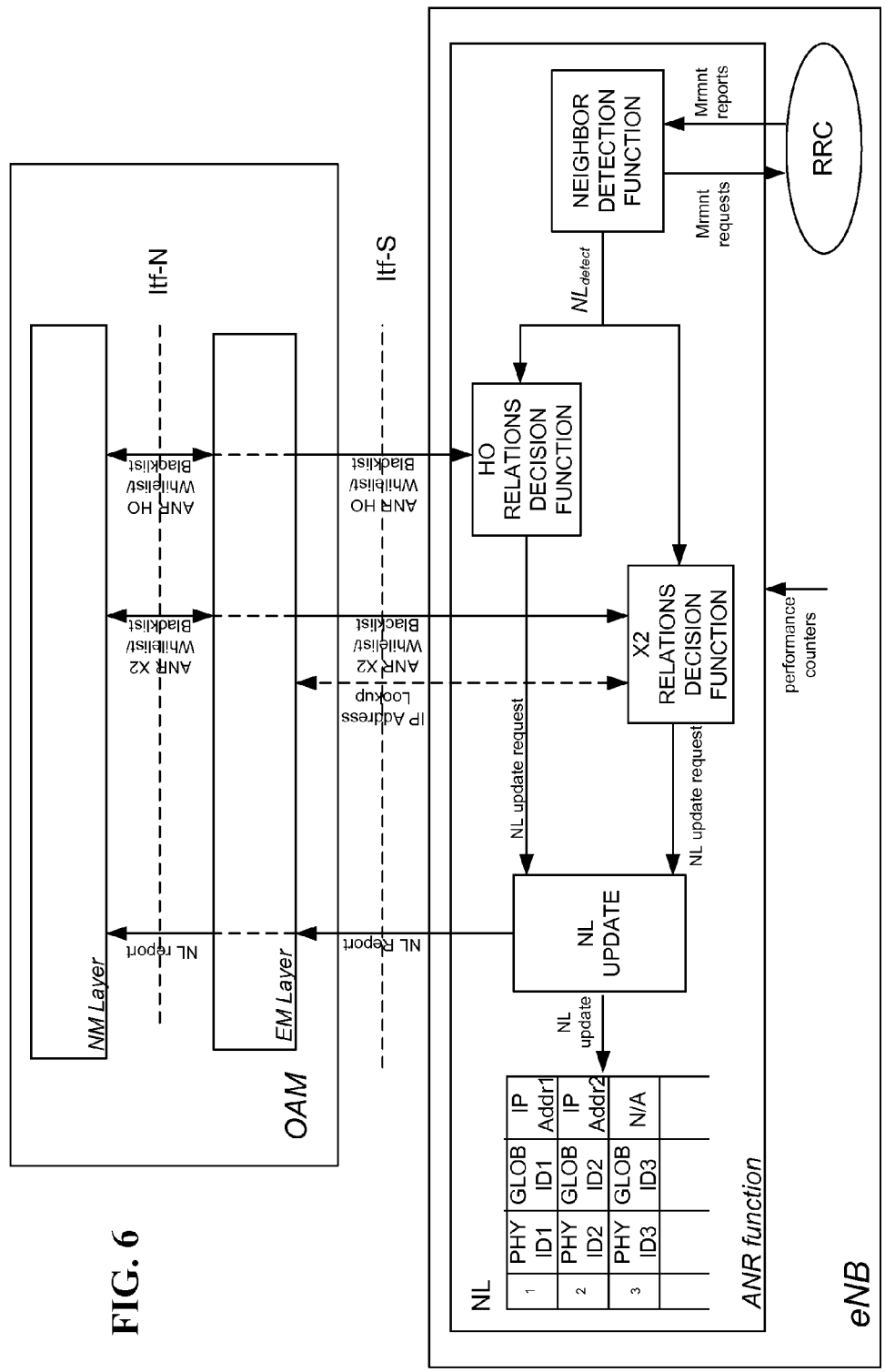
FIG. 6 is an exemplary schematic of a distributed model for facilitating execution of ANR functions.

Referring next to FIG. 6 an exemplary schematic of a distributed model for facilitating execution of ANR functions is provided. Within such embodiment, execution of ANR functions is concentrated in the base station. As illustrated, an eNB includes an ANR function component comprising various subcomponents. In particular, the eNB is shown to include a subcomponent for neighbor cell detection, handover relations, X2 relations, and neighbor list updates.

As illustrated, the neighbor cell detection subcomponent is coupled to an RRC component which receives and requests neighbor cell data from access terminals. Neighbor cell data received from the RRC component is then input from the detection subcomponent to the handover relations subcomponent and the X2 relations subcomponent.

For this particular embodiment, the eNB determines whether to add/remove Handover Relations and X2 relations from a neighbor list. With respect to the Handover Relations, such updates should comply with constraints set by an ANR whitelist/blacklist provided by the OAM, wherein Physical and Global IDs of cells are added/removed from the neighbor list as determined by the handover relations subcomponent. Similarly, with respect to the X2 Relations, such updates should comply with constraints set by an ANR X2 blacklist/whitelist provided by the OAM, wherein the address of a target eNB/cell to be added/removed from the neighbor list is determined by the X2 relations subcomponent. Here, it should be appreciated that, if necessary, an IP address lookup for a target eNB/cell can be performed in the element manager (EM) or network manager (NM) layer of the OAM, as shown.

In another aspect, the eNB informs the OAM of updates to the neighbor list. Upon receiving a neighbor list update from the eNB, the OAM may in turn update the ANR whitelist/blacklist and ANR X2 blacklist/whitelist. As illustrated, the updated ANR whitelist/blacklist and ANR X2 blacklist/whitelist may then be provided to the eNB for subsequent ANR processing.

With respect to functionality in the OAM, it should be appreciated that neighbor list update reports from the eNB are visible to both the EM layer and NM layer. It should also be appreciated that the ANR X2 blacklist/whitelist and ANR whitelist/blacklist can be sent from NM layer to EM layer and from EM to eNB, wherein a negotiation is possible between the NM layer and the EM layer regarding each. For instance, if the EM Layer wants to update the ANR X2 blacklist/whitelist based on local information, this negotiation functionality allow the EM layer to do so and report it to the NM layer.

Figure 7:
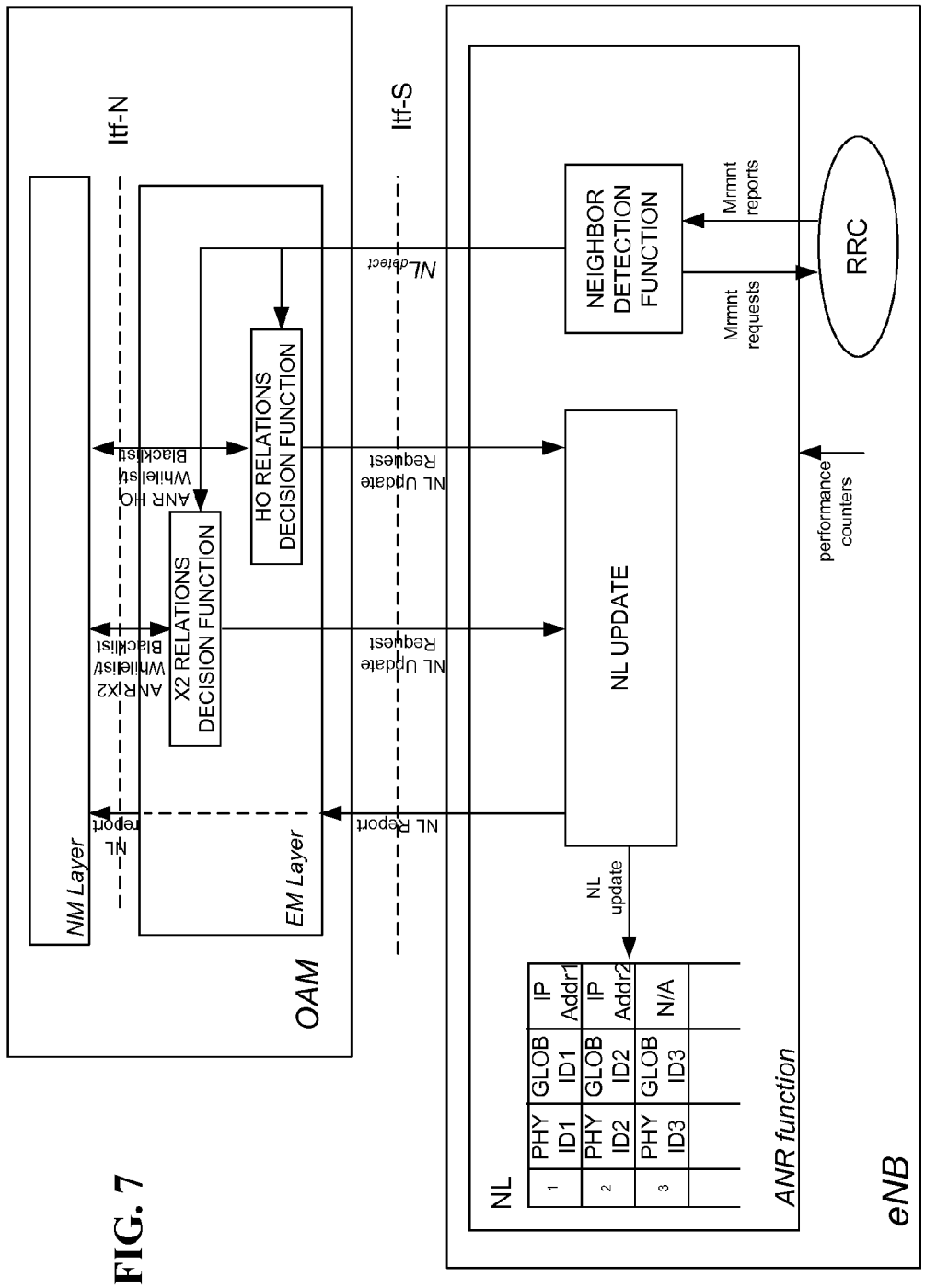
FIG. 7 is an exemplary schematic of a centralized model for facilitating execution of ANR functions.

Referring next to FIG. 7 an exemplary schematic of a centralized model for facilitating execution of ANR functions is provided. Within such embodiment, execution of ANR functions is concentrated in the OAM. For this particular example, the OAM includes the aforementioned handover relations subcomponent and X2 relations subcomponent, as shown. Here, upon receiving detection data from the RRC, the neighbor detection subcomponent of the eNB routes this detection data to the OAM for further processing. With respect to Handover Relations, Physical and Global IDs of cells are thus added/removed from the neighbor list as determined by the handover relations subcomponent residing in the OAM. Similarly, with respect to the X2 Relations, the address of a target eNB/cell to be added/removed from the neighbor list is determined by the X2 relations subcomponent residing in the OAM. All other aspects of the centralized model are substantially similar to the distributed model.

Figure 8:
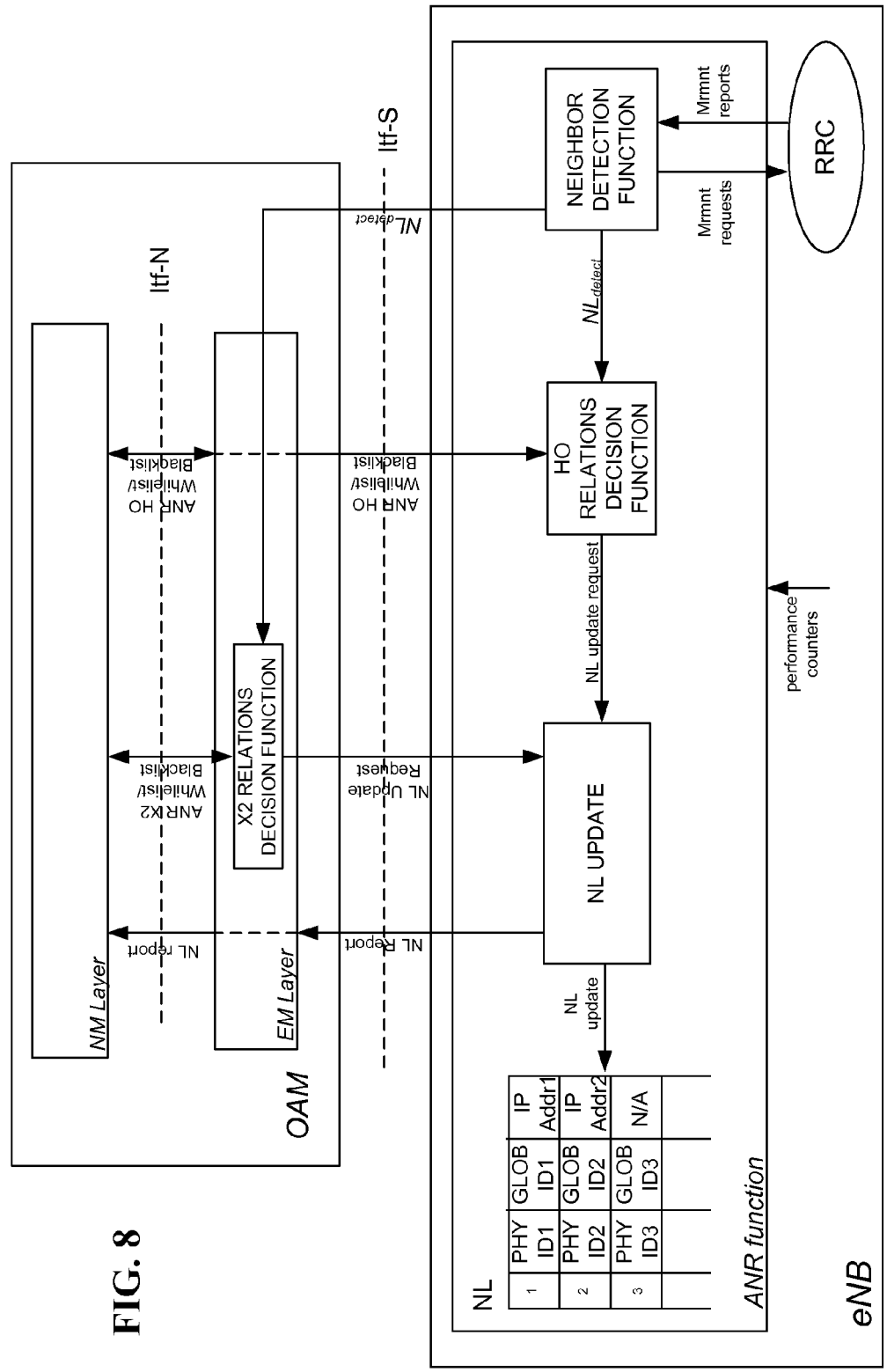
FIG. 8 is an exemplary schematic of a hybrid model for facilitating execution of ANR functions.

Referring next to FIG. 8 an exemplary schematic of a hybrid model for facilitating execution of ANR functions is provided. Within such embodiment, execution of ANR functions is shared between the OAM and the base station. For this particular example, the handover relations subcomponent resides in the eNB, whereas the X2 relations subcomponent resides in the OAM. Here, upon receiving detection data from the RRC, the neighbor detection subcomponent routes the detection data to both the handover relations subcomponent in the eNB and the X2 relations subcomponent in the OAM. With respect to Handover Relations, Physical and Global IDs of cells are thus added/removed from the neighbor list as determined by the handover relations subcomponent residing in the eNB. However, with respect to the X2 Relations, the address of a target eNB/cell to be added/removed from the neighbor list is determined by the X2 relations subcomponent residing in the OAM. All other aspects of the hybrid model are substantially similar to both the distributed model and the centralized model.

Figure 9:
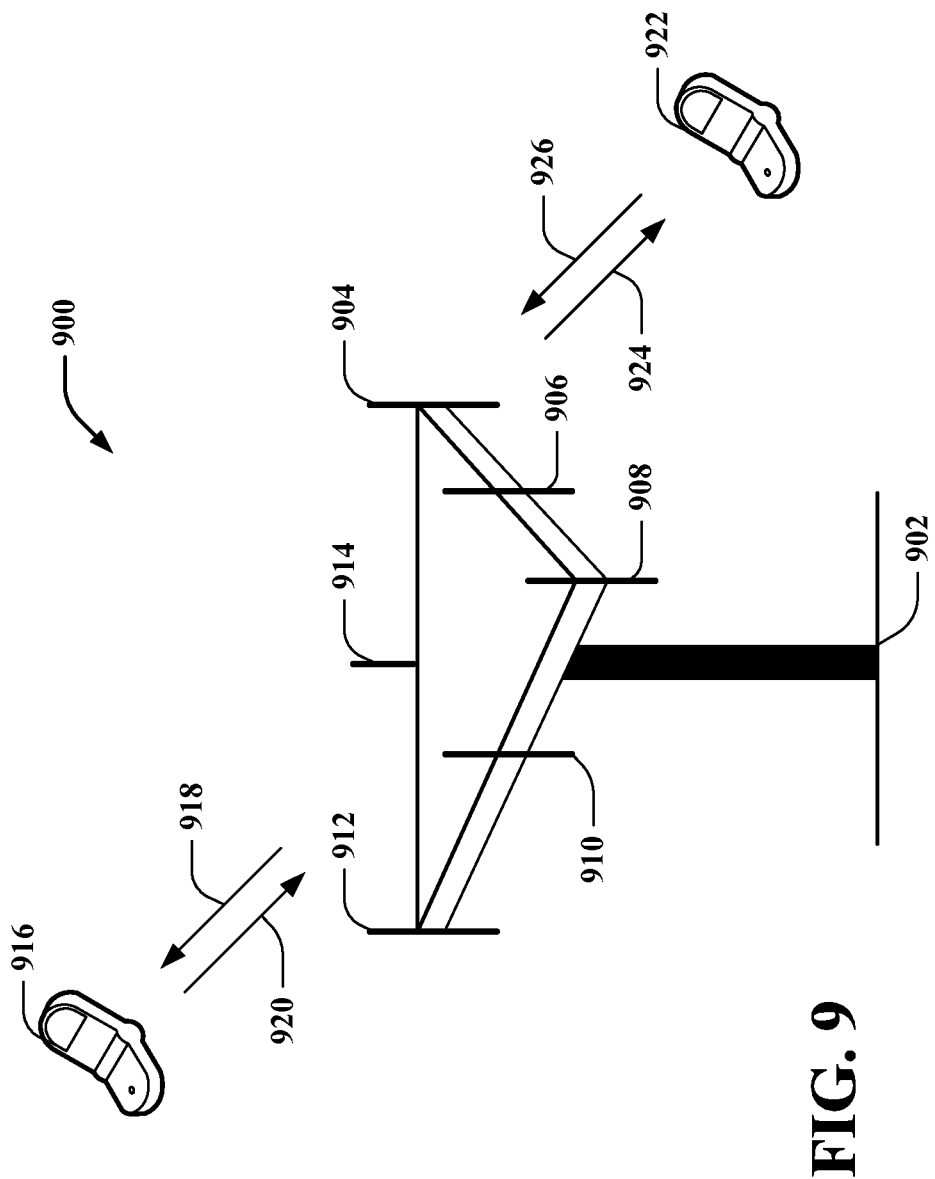
FIG. 9 is an illustration of a wireless communication system in accordance with various aspects set forth herein.

Referring now to FIG. 9, a wireless communication system 900 is illustrated in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 902 can communicate with one or more access terminals such as access terminal 916 and access terminal 922; however, it is to be appreciated that base station 902 can communicate with substantially any number of access terminals similar to access terminals 916 and 922. Access terminals 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, access terminal 916 is in communication with antennas 912 and 914, where antennas 912 and 914 transmit information to access terminal 916 over a forward link 918 and receive information from access terminal 916 over a reverse link 920. Moreover, access terminal 922 is in communication with antennas 904 and 906, where antennas 904 and 906 transmit information to access terminal 922 over a forward link 924 and receive information from access terminal 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to access terminals in a sector of the areas covered by base station 902. In communication over forward links 918 and 924, the transmitting antennas of base station 902 can utilize beamforming to improve signal-to-noise ratio of forward links 918 and 924 for access terminals 916 and 922. Also, while base station 902 utilizes beamforming to transmit to access terminals 916 and 922 scattered randomly through an associated coverage, access terminals in neighboring cells can be subject to less interference as compared to a base station transmitting through a single antenna to all its access terminals.

Figure 10:
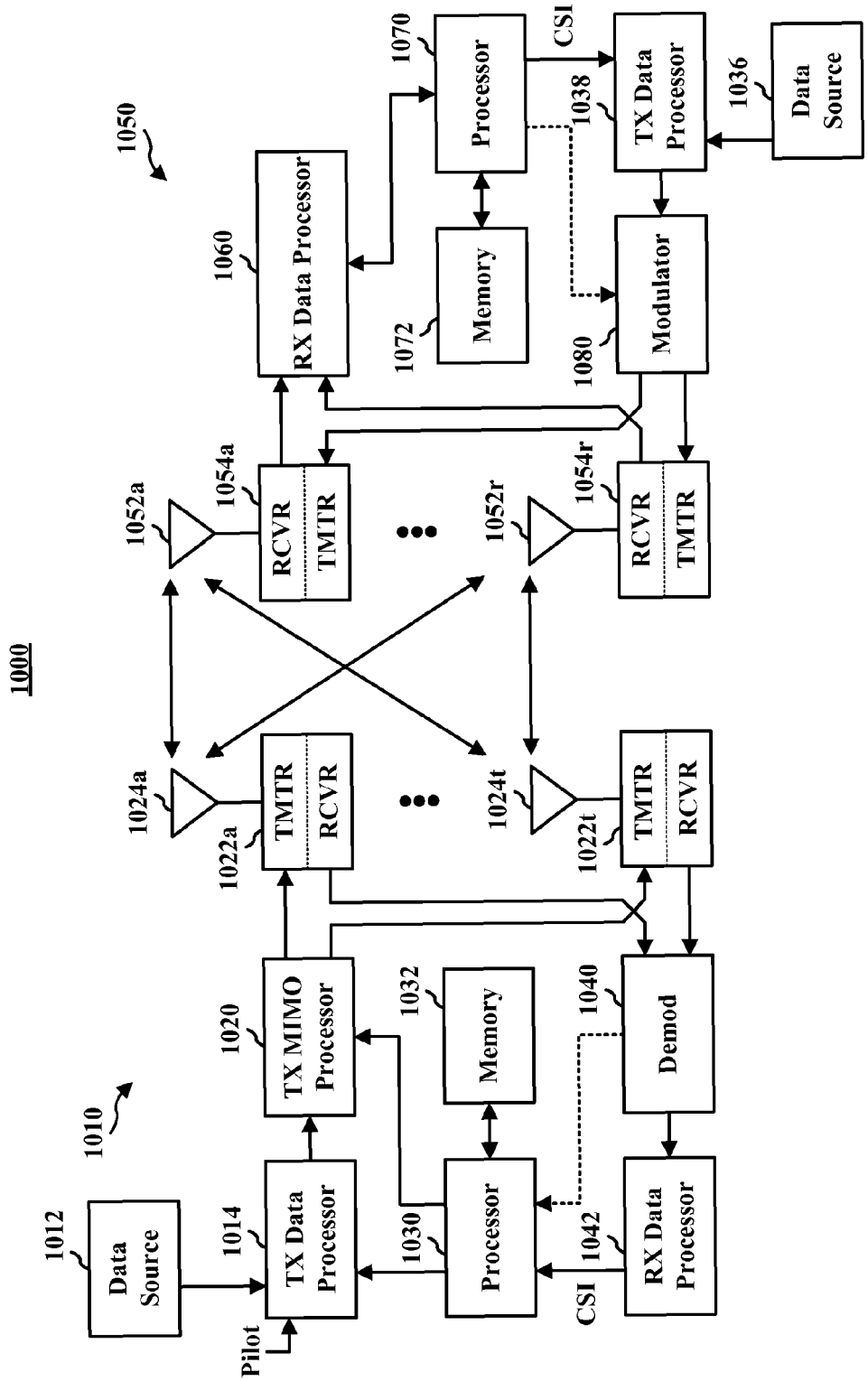
FIG. 10 is an illustration of an exemplary wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems and/or methods described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

Figure 11:
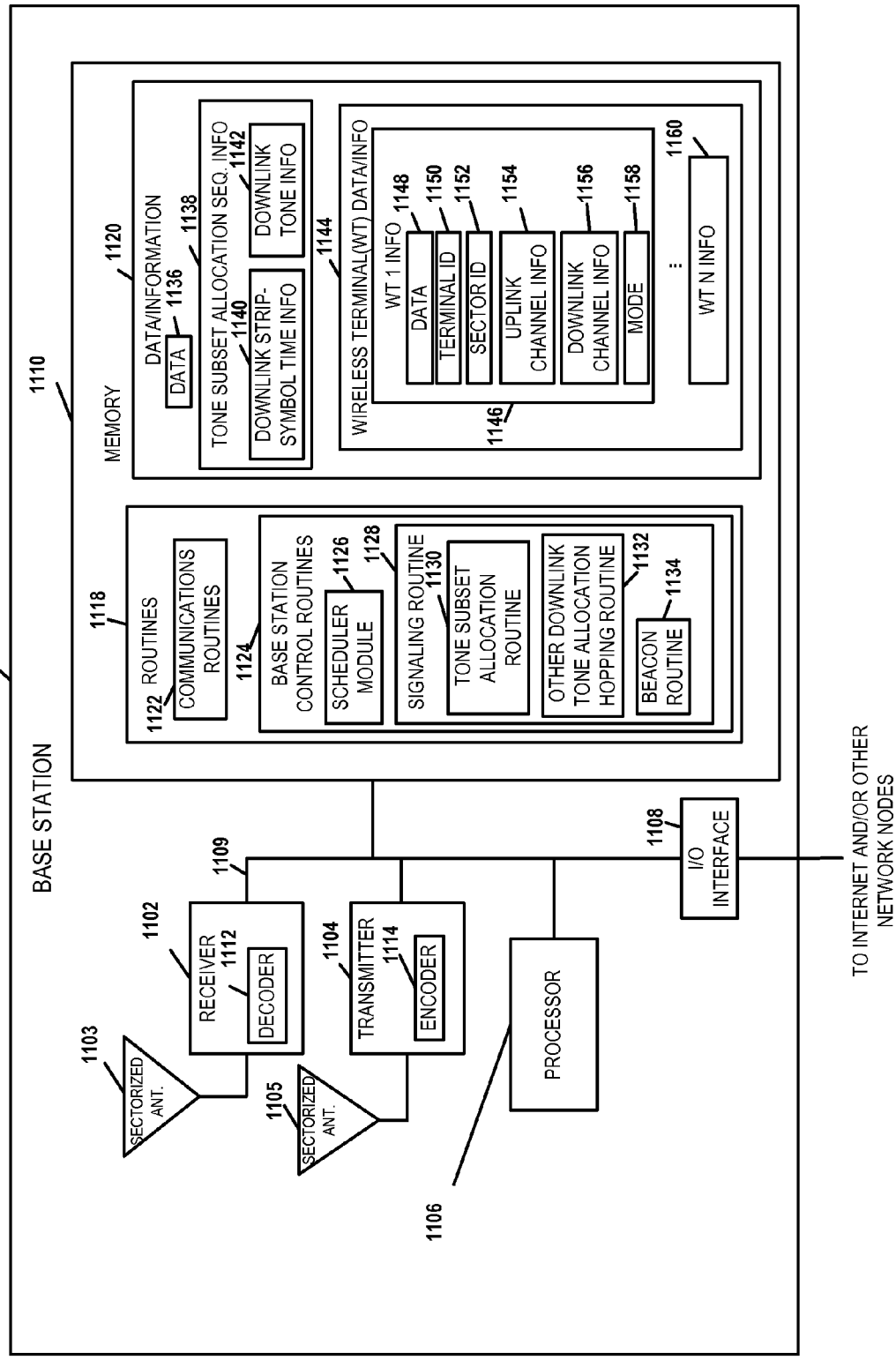
FIG. 11 is an illustration of an exemplary base station in accordance with various aspects described herein.

FIG. 11 illustrates an exemplary base station 1100 in accordance with various aspects. Base station 1100 implements tone subset allocation sequences, with different tone subset allocation sequences generated for respective different sector types of the cell. The base station 1100 includes a receiver 1102, a transmitter 1104, a processor 1106, e.g., CPU, an input/output interface 1108 and memory 1110 coupled together by a bus 1109 over which various elements 1102, 1104, 1106, 1108, and 1110 may interchange data and information.

Sectorized antenna 1103 coupled to receiver 1102 is used for receiving data and other signals, e.g., channel reports, from wireless terminals transmissions from each sector within the base station's cell. Sectorized antenna 1105 coupled to transmitter 1104 is used for transmitting data and other signals, e.g., control signals, pilot signal, beacon signals, etc. to wireless terminals 1200 (see FIG. 12) within each sector of the base station's cell. In various aspects, base station 1100 may employ multiple receivers 1102 and multiple transmitters 1104, e.g., an individual receiver 1102 for each sector and an individual transmitter 1104 for each sector. Processor 1106, may be, e.g., a general purpose central processing unit (CPU). Processor 1106 controls operation of base station 1100 under direction of one or more routines 1118 stored in memory 1110 and implements the methods. I/O interface 1108 provides a connection to other network nodes, coupling the BS 1100 to other base stations, access routers, AAA server nodes, etc., other networks, and the Internet. Memory 1110 includes routines 1118 and data/information 1120.

Data/ information 1120 includes data 1136, tone subset allocation sequence information 1138 including downlink strip-symbol time information 1140 and downlink tone information 1142, and wireless terminal (WT) data/info 1144 including a plurality of sets of WT information: WT 1 info 1146 and WT N info 1160. Each set of WT info, e.g., WT 1 info 1146 includes data 1148, terminal ID 1150, sector ID 1152, uplink channel information 1154, downlink channel information 1156, and mode information 1158.

Routines 1118 include communications routines 1122 and base station control routines 1124. Base station control routines 1124 includes a scheduler module 1126 and signaling routines 1128 including a tone subset allocation routine 1130 for strip-symbol periods, other downlink tone allocation hopping routine 1132 for the rest of symbol periods, e.g., non strip-symbol periods, and a beacon routine 1134.

Data 1136 includes data to be transmitted that will be sent to encoder 1114 of transmitter 1104 for encoding prior to transmission to WTs, and received data from WTs that has been processed through decoder 1112 of receiver 1102 following reception. Downlink strip-symbol time information 1140 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1142 includes information including a carrier frequency assigned to the base station 1100, the number and frequency of tones, and the set of tone subsets to be allocated to the strip-symbol periods, and other cell and sector specific values such as slope, slope index and sector type.

Data 1148 may include data that WT1 1200 has received from a peer node, data that WT 1 1200 desires to be transmitted to a peer node, and downlink channel quality report feedback information. Terminal ID 1150 is a base station 1100 assigned ID that identifies WT 1 1200. Sector ID 1152 includes information identifying the sector in which WT1 1200 is operating. Sector ID 1152 can be used, for example, to determine the sector type. Uplink channel information 1154 includes information identifying channel segments that have been allocated by scheduler 1126 for WT1 1200 to use, e.g., uplink traffic channel segments for data, dedicated uplink control channels for requests, power control, timing control, etc. Each uplink channel assigned to WT 1 1200 includes one or more logical tones, each logical tone following an uplink hopping sequence. Downlink channel information 1156 includes information identifying channel segments that have been allocated by scheduler 1126 to carry data and/or information to WT1 1200, e.g., downlink traffic channel segments for user data. Each downlink channel assigned to WT1 1200 includes one or more logical tones, each following a downlink hopping sequence. Mode information 1158 includes information identifying the state of operation of WT1 1200, e.g. sleep, hold, on.

Communications routines 1122 control the base station 1100 to perform various communications operations and implement various communications protocols. Base station control routines 1124 are used to control the base station 1100 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1128 controls the operation of receiver 1102 with its decoder 1112 and transmitter 1104 with its encoder 1114. The signaling routine 1128 is responsible controlling the generation of transmitted data 1136 and control information. Tone subset allocation routine 1130 constructs the tone subset to be used in a strip-symbol period using the method of the aspect and using data/info 1120 including downlink strip-symbol time info 1140 and sector ID 1152. The downlink tone subset allocation sequences will be different for each sector type in a cell and different for adjacent cells. The WTs 1200 receive the signals in the strip-symbol periods in accordance with the downlink tone subset allocation sequences; the base station 1100 uses the same downlink tone subset allocation sequences in order to generate the transmitted signals. Other downlink tone allocation hopping routine 1132 constructs downlink tone hopping sequences, using information including downlink tone information 1142, and downlink channel information 1156, for the symbol periods other than the strip-symbol periods. The downlink data tone hopping sequences are synchronized across the sectors of a cell. Beacon routine 1134 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 12:
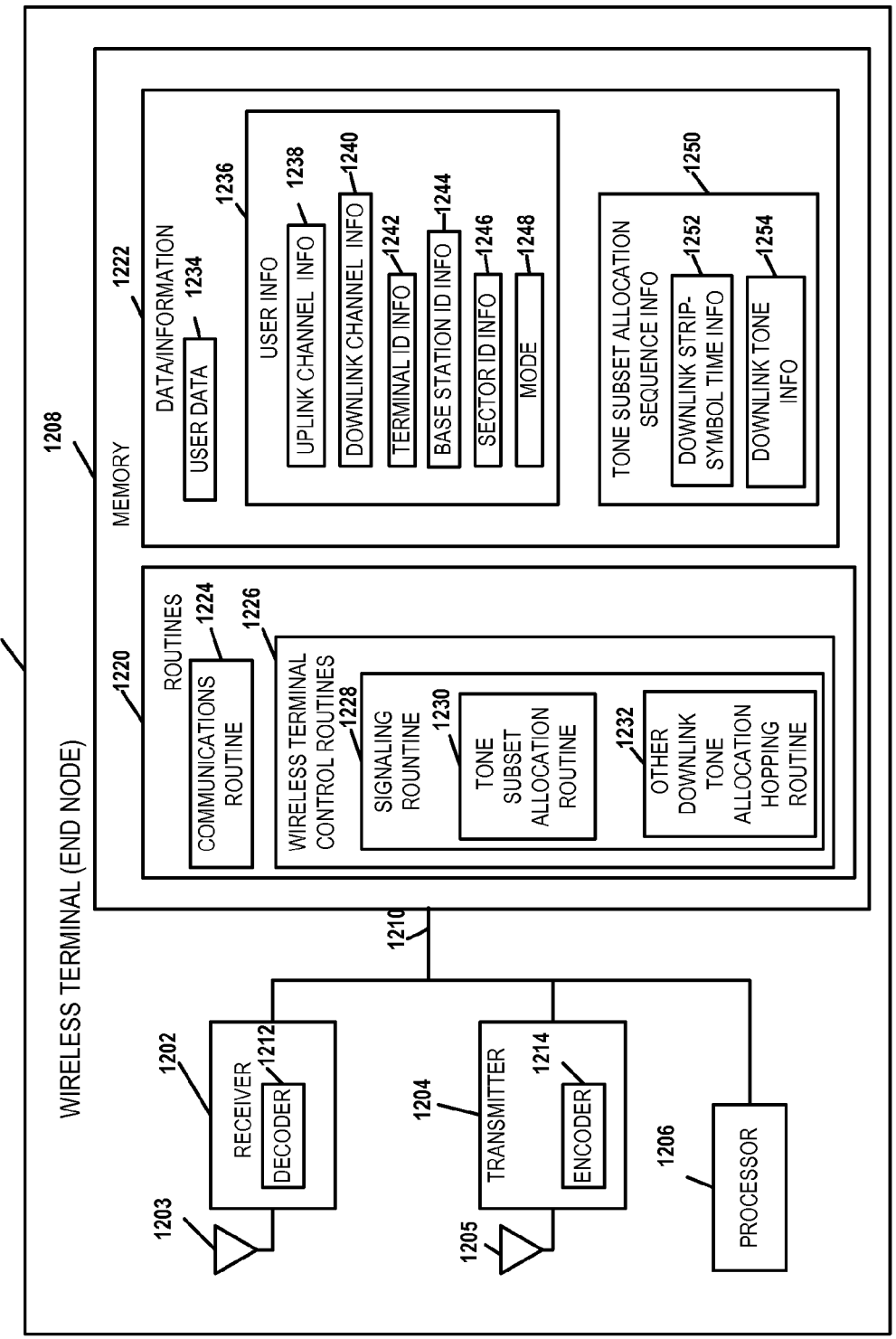
FIG. 12 is an illustration of an exemplary wireless terminal implemented in accordance with various aspects described herein.

FIG. 12 illustrates an exemplary wireless terminal (end node) 1200. Wireless terminal 1200 implements the tone subset allocation sequences. The wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (and/or a disparate wireless terminal) is coupled to receiver 1202. An antenna 1205 used for transmitting signals, e.g., to a base station (and/or a disparate wireless terminal) is coupled to transmitter 1204.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by a base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by a base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station-assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. The signaling routine 1228 includes a tone subset allocation routine 1230 for the strip-symbol periods and an other downlink tone allocation hopping routine 1232 for the rest of symbol periods, e.g., non strip-symbol periods. Tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some aspects and process received data transmitted from the base station. Other downlink tone allocation hopping routine 1230 constructs downlink tone hopping sequences, using information including downlink tone information 1254, and downlink channel information 1240, for the symbol periods other than the strip-symbol periods. Tone subset allocation routine 1230, when executed by processor 1206, is used to determine when and on which tones the wireless terminal 1200 is to receive one or more strip-symbol signals from a base station. The uplink tone allocation hopping routine 1230 uses a tone subset allocation function, along with information received from the base station, to determine the tones in which it should transmit on.

In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method for a base station in a wireless network to facilitate execution of automatic neighbor relation (ANR) functions, comprising:
   receiving neighbor cell detection data from an access terminal, the neighbor cell detection data identifying neighbor cells detected by the access terminal;
   transmitting a neighbor list report to an operation and maintenance (OAM) system, the neighbor list report including a summary of updates made to a neighbor list;
   receiving neighbor cell management data from the OAM system, the neighbor cell management data including data that facilitates performing at least one ANR function; and
   automating an update of the neighbor list as a function of the neighbor cell management data and the neighbor cell detection data.

2. The method of claim 1, the receiving neighbor cell management data act including receiving a command to update a handover relation aspect of the neighbor list.

3. The method of claim 1, the receiving neighbor cell management data act including receiving a command to update an X2 relation aspect of the neighbor list.

4. The method of claim 1, the receiving neighbor cell management data act including receiving at least one of a handover blacklist or a handover whitelist, the automating act including updating a handover relation aspect of the neighbor list as a function of the at least one handover blacklist or handover whitelist.

5. The method of claim 1, the receiving neighbor cell management data act including receiving at least one of an X2 blacklist or an X2 whitelist, the automating act including updating an X2 relation aspect of the neighbor list as a function of the at least one X2 blacklist or X2 whitelist.

6. The method of claim 1, the receiving neighbor cell management data act including receiving an IP address, the automating act including updating an X2 relation aspect of the neighbor list to include the IP address.

7. The method of claim 1 further comprising transmitting a global ID request to the access terminal, the global ID request corresponding to a neighbor cell identified in the neighbor cell detection data, the automating act including updating the neighbor list to include a global ID received from the access terminal.

8. The method of claim 1 further comprising transmitting at least a portion of the neighbor cell detection data to the OAM system.

9. The method of claim 1, the receiving neighbor cell management data act including receiving a neighbor list update request, the neighbor list update request including at least one of a handover relation update or an X2 relation update, the automating act including updating at least one of a handover relation aspect of the neighbor list or an X2 relation aspect of the neighbor list as a function of the neighbor list update request.

10. A base station for facilitating execution of automatic neighbor relation (ANR) functions in a wireless system, comprising:
a radio resource control (RRC) component configured to facilitate communications between the base station and an access terminal, the RRC component configured to receive neighbor cell detection data from the access terminal, the neighbor cell detection data identifying neighbor cells detected by the access terminal;
an interface component configured to facilitate communications between the base station and an operation and maintenance (OAM) system, the interface component configured to transmit a neighbor list report to the OAM system, the neighbor list report including a summary of updates made to a neighbor list, the interface component configured to receive neighbor cell management data from the OAM system, the neighbor cell management data including data that facilitates performing at least one ANR function; and
an ANR function component configured to automatically update the neighbor list as a function of the neighbor cell management data and the neighbor cell detection data.

11. The base station of claim 10, the neighbor cell management data including a command to update a handover relation aspect of the neighbor list, the ANR function component configured to receive the command as an input to a handover relation subcomponent, the ANR function component configured to automatically update the handover relation aspect of the neighbor list according to the command.

12. The base station of claim 10, the neighbor cell management data including a command to update an X2 relation aspect of the neighbor list, the ANR function component configured to receive the command as an input to an X2 relation subcomponent, the ANR function component configured to automatically update the X2 relation aspect of the neighbor list according to the command.

13. The base station of claim 10, the neighbor cell management data including at least one of a handover blacklist or a handover whitelist, the ANR function component configured to receive the at least one handover blacklist or handover whitelist as an input to a handover relation subcomponent, the ANR function component configured to automatically update a handover relation aspect of the neighbor list as a function of the at least one handover blacklist or handover whitelist.

14. The base station of claim 10, the neighbor cell management data including at least one of an X2 blacklist or an X2 whitelist, the ANR function component configured to receive the at least one X2 blacklist or X2 whitelist as an input to an X2 relation subcomponent, the ANR function component configured to automatically update an X2 relation aspect of the neighbor list as a function of the at least one X2 blacklist or X2 whitelist.

15. The base station of claim 10, the neighbor cell management data including an IP address, the ANR function component configured to automatically update the neighbor list to include the IP address.

16. The base station of claim 10, the RRC component further configured to transmit a global ID request to the access terminal, the global ID request corresponding to a neighbor cell identified in the neighbor cell detection data, the ANR function component configured to automatically update the neighbor list to include a global ID received from the access terminal.

17. The base station of claim 10, the interface component further configured to transmit at least a portion of the neighbor cell detection data to the OAM system.

18. The base station of claim 10, the neighbor cell management data including a neighbor list update request, the neighbor list update request including at least one of a handover relation update or an X2 relation update, the ANR function component configured to automatically update at least one of a handover relation aspect of the neighbor list or an X2 relation aspect of the neighbor list as a function of the neighbor list update request.

19. A computer program product for facilitating execution of automatic neighbor relation (ANR) functions in a wireless system from a base station, comprising:
a computer-readable storage medium comprising:
code for receiving neighbor cell detection data from an access terminal, the neighbor cell detection data identifying neighbor cells detected by the access terminal;
code for transmitting a neighbor list report to an operation and maintenance (OAM) system, the neighbor list report including a summary of updates made to a neighbor list;
code for receiving neighbor cell management data from the OAM system, the neighbor cell management data including data that facilitates performing at least one ANR function; and
code for automating an update of the neighbor list as a function of the neighbor cell management data and the neighbor cell detection data.

20. An apparatus for facilitating execution of automatic neighbor relation (ANR) functions in a wireless system from a base station, comprising:
means for receiving neighbor cell detection data from an access terminal, the neighbor cell detection data identifying neighbor cells detected by the access terminal;
means for transmitting a neighbor list report to an operation and maintenance (OAM) system, the neighbor list report including a summary of updates made to a neighbor list;
means for receiving neighbor cell management data from the OAM system, the neighbor cell management data including data that facilitates performing at least one ANR function; and
means for automating an update of the neighbor list as a function of the neighbor cell management data and the neighbor cell detection data.

21. A method for an operation and maintenance (OAM) system in a wireless network to facilitate execution of automatic neighbor relation (ANR) functions in a base station, comprising:
receiving ANR data from the base station, the ANR data including at least one of neighbor cell detection data or neighbor list report data, the neighbor cell detection data identifying neighbor cells detected by an access terminal, the neighbor list report data including a summary of updates made to a neighbor list;
generating neighbor cell management data, the neighbor cell management data generated as a function of the ANR data and including data that facilitates performing at least one ANR function; and
transmitting the neighbor cell management data to the base station.

22. The method of claim 21, the generating act comprising generating neighbor cell management data that includes a command to update a handover relation aspect of the neighbor list.

23. The method of claim 21, the generating act comprising generating neighbor cell management data that includes a command to update an X2 relation aspect of the neighbor list.

24. The method of claim 21, the generating act comprising generating neighbor cell management data that includes at least one of a handover blacklist or a handover whitelist, the at least one handover blacklist or handover whitelist facilitating performing an ANR function that updates a handover relation aspect of the neighbor list.

25. The method of claim 24 further comprising facilitating a communication between a network manager layer and an element manager layer, the generating act generating contents of the at least one handover blacklist or handover whitelist as a function of the communication.

26. The method of claim 21, the generating act comprising generating neighbor cell management data that includes at least one of an X2 blacklist or an X2 whitelist, the at least one X2 blacklist or X2 whitelist facilitating performing an ANR function that updates an X2 relation aspect of the neighbor list.

27. The method of claim 26 further comprising facilitating a communication between a network manager layer and an element manager layer, the generating act generating contents of the at least one X2 blacklist or X2 whitelist as a function of the communication.

28. The method of claim 21, the generating act comprising generating neighbor cell management data that includes an IP address, the IP address facilitating performing an ANR function that updates an X2 relation aspect of the neighbor list so as to include the IP address.

29. The method of claim 21, the generating act comprising generating neighbor cell management data that includes a neighbor list update request, the neighbor list update request facilitating performing an ANR function that updates at least one of a handover relation aspect of the neighbor list or an X2 relation aspect of the neighbor list as a function of the neighbor list update request.

30. An operation and maintenance (OAM) system for facilitating execution of automatic neighbor relation (ANR) functions in a base station, comprising:
  a receiving component configured to facilitate receiving ANR data from the base station, the ANR data including at least one of neighbor cell detection data or neighbor list report data, the neighbor cell detection data identifying neighbor cells detected by an access terminal, the neighbor list report data including a summary of updates made to a neighbor list;
  an ANR manager component configured to generate neighbor cell management data, the neighbor cell management data generated as a function of the ANR data and including data that facilitates performing at least one ANR function;
  a transmitting component configured to transmit the neighbor cell management data to the base station.

31. The OAM system of claim 30, the ANR manager component configured to generate neighbor cell management data that includes a command to update a handover relation aspect of the neighbor list.

32. The OAM system of claim 30, the ANR manager component configured to generate neighbor cell management data that includes a command to update an X2 relation aspect of the neighbor list.

33. The OAM system of claim 30, the ANR manager component configured to generate neighbor cell management data that includes at least one of a handover blacklist or a handover whitelist, the at least one handover blacklist or handover whitelist facilitating performing an ANR function that updates a handover relation aspect of the neighbor list.

34. The OAM system of claim 33, the ANR manager component comprising a network manager layer and an element manager layer, the ANR manager component configured to generate contents of the at least one handover blacklist or handover whitelist as a function of a negotiation between the network manager layer and the element manager layer.

35. The OAM system of claim 30, the ANR manager component configured to generate neighbor cell management data that includes at least one of an X2 blacklist or an X2 whitelist, the at least one X2 blacklist or X2 whitelist facilitating performing an ANR function that updates an X2 relation aspect of the neighbor list.

36. The OAM system of claim 35, the ANR manager component comprising a network manager layer and an element manager layer, the ANR manager component configured to generate contents of the at least one X2 blacklist or X2 whitelist as a function of a negotiation between the network manager layer and the element manager layer.

37. The OAM system of claim 30, the ANR manager component configured to generate neighbor cell management data that includes an IP address, the IP address facilitating performing an ANR function that updates an X2 relation aspect of the neighbor list so as to include the IP address.

38. The OAM system of claim 30, the ANR manager component configured to generate neighbor cell management data that includes a neighbor list update request, the neighbor list update request facilitating performing an ANR function that updates at least one of a handover relation aspect of the neighbor list or an X2 relation aspect of the neighbor list as a function of the neighbor list update request.

39. A computer program product for facilitating execution of automatic neighbor relation (ANR) functions in a base station from an operation and maintenance (OAM) system, comprising:
  a computer-readable storage medium comprising:
    code for receiving ANR data from the base station, the ANR data including at least one of neighbor cell detection data or neighbor list report data, the neighbor cell detection data identifying neighbor cells detected by an access terminal, the neighbor list report data including a summary of updates made to a neighbor list;
    code for generating neighbor cell management data, the neighbor cell management data generated as a function of the ANR data and including data that facilitates performing at least one ANR function; and
    code for transmitting the neighbor cell management data to the base station.

40. An apparatus for facilitating execution of automatic neighbor relation (ANR) functions in a base station from an operation and maintenance (OAM) system, comprising:
  means for receiving ANR data from the base station, the ANR data including at least one of neighbor cell detection data or neighbor list report data, the neighbor cell detection data identifying neighbor cells detected by an access terminal, the neighbor list report data including a summary of updates made to a neighbor list;
  means for generating neighbor cell management data, the neighbor cell management data generated as a function of the ANR data and including data that facilitates performing at least one ANR function; and means for transmitting the neighbor cell management data to the base station.

\* \* \* \* \*